UNITED STATES PATENT OFFICE

2,683,715

4-TERTIARY AMINO-1-ALKYL-PIPERIDINES AND PROCESS OF PRODUCING THEM

Rolf Kallischnigg, Ludwigshafen, Germany, assignor to Knoll A. G., Ludwigshafen, Germany, a corporation of Germany No Drawing. Application August 25, 1953,
Serial No. 376,532

Claims priority, application Germany
July 20, 1949

11 Claims. (Cl. 260—293)

The present invention relates to new therapeutically valuable compounds with antiallergic effect. They are derivatives of the 4-(N-phenyl-N-benzyl)-amino-1-methylpiperidine of the formula:

I 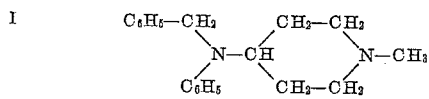

This application is a continuation in part of my copending application Serial No. 152,010, filed July 20, 1949.

As indicated in this copending application the new compound 4-(N-phenyl-N-benzyl)-amino-1-methylpiperidine has not only a very strong spasmolytic action upon the system of unstriped muscles but also an antihistamine action equal to the antihistamine action of the best known preparations of this group of remedies, and has also a high anticholic action. Another advantage of this compound is its lack of toxicity and its better compatibility if compared with that of other known antihistamines.

The 4-(N-phenyl-N-benzyl)-amino-1-methylpiperidine and its derivatives may be produced by condensing 1-alkyl-piperidone-4 with aniline or aniline substituted in the nucleus, respectively. Compounds of this type of Schiff's bases are obtained which are transformed into a secondary amine by reduction by means of hydrogen and catalysts or by means of chemical reducing agents, such as aluminum or amalgamated aluminum. The hydrogen atom linked to the nitrogen atom of the secondary amine is then replaced by a metallic residue of the group consisting of Na, K, Li, Mg-halogen. The metal compound thus obtained is reacted with benzyl chloride or a derivative thereof substituted in the nucleus. A tertiary amine is formed thereby. Instead of the metals themselves, their amides, such as sodium amide, may be used in the preparation of the above named metal compounds. The residue Mg-halogen is used in the form of a Grignard compound.

While in the copending application Serial No. 152,010 the 4-(N-phenyl-N-benzyl)-amino-1-methylpiperidine and such derivatives thereof are described and claimed which are obtained by substitution of hydrogen atoms of the phenyl group, my present invention is concerned with such derivatives of said methylpiperidine compound in which the hydrogen atoms in the 4-position of the benzyl group are replaced by the atoms or groups Cl, Br, CH₃ or OCH₃. I have found that these derivatives, too, have antiallergic effect.

These new compounds may be obtained in a corresponding manner as described above, the only difference being that, instead of the benzyl chloride, such derivatives thereof are employed in which the hydrogen of the p-position is substituted by the atoms or groups Cl, Br, CH₃ or OCH₃. As previously described, the transformation of the Schiff's base with one of the said derivatives of benzyl chloride is carried out by preliminarily replacing the tertiary hydrogen atom of the amino group by a metal and then reacting the metal compound thus obtained with the p-substituted benzyl chloride, according to the scheme:

II  C₆H₅.NH.R→
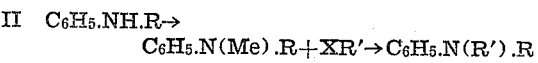

The tertiary hydrogen atom may also be replaced, instead, by the Grignard group (MgX), and the resulting Grignard compound may be reacted with the p-substituted benzyl chloride. It is self-understanding that in any case the benzyl chloride compounds may be replaced by corresponding benzyl bromide or benzyl iodide compounds.

It is a further object of my present invention to produce the said new compounds by starting with such benzyl aniline derivatives in which the hydrogen of the p-position of the benzyl group is substituted by one of the atoms or groups Cl, Br, CH₃ or OCH₃, and by condensing these p-substituted benzyl aniline products with a 4-halogen-1-methylpiperidine in the presence of a condensing agent. Sodium amide or dry potassium carbonate may, for example, be employed as condensing agents.

The new process in accordance with the present invention is illustrated by the following examples.

EXAMPLE 1

*4-(4'-methoxybenzylanilino)-1-methylpiperidine*

(a) *Anil of 1-methyl-piperidone-4.*—80 grams of 1-methyl-piperidone-4 and 70 g. of aniline are boiled in a water separator with 350 cc. of toluene, to which a few drops of glacial acetic acid have been added, until the theoretical amount of water (12.7 cc.) has separated. The toluene is then distilled off and the residue is fractionated at reduced pressure. At a pressure of 13 mm. Hg and a temperature of 156° C., an oil of a pale yellow color is obtained.

(b) *4-N - phenyl-amino-1-methylpiperidine.*—
100 g. of the anil of 1-methyl-piperidone-4 are boiled with reflux for 8 hours with 30 g. of aluminum shavings (activated by mercury chloride) in 300 cc. of methanol and 60 cc. of water. The liquid layer is then separated from the solid, the solvent of the liquid is evaporated, and the residue is fractionated under reduced pressure, whereby at a temperature of 163–165° C. and a pressure of 15 mm. Hg, 95 g. of a colorless oil are obtained which crystallizes immediately. The residue base recrystallized from dibutyl ether melts at 87° C.; the dihydrochloride of the base has a melting point of 246° C.

(c) *4 - (4' - methoxybenzylanilino) -1-methylpiperidine.*—

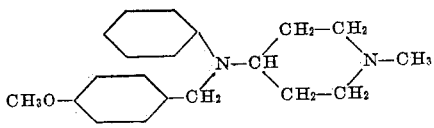

In a three-necked flask provided with stirrer, drop funnel, gas supply pipe, and reflux condenser with $CaCl_2$ drying tubes, there are dissolved 30 g. of 4-anilino-1-methylpiperidine in 300 cc. of dry benzene. Thereafter, 8 g. of finely powdered sodium amide are added, and the reaction product is heated with stirring and introduction of nitrogen to boiling until the development of ammonia has practically ceased. Thereupon, 27 g. of p-methoxybenzyl chloride are added in drops, and boiling is continued for further four hours with reflux. After cooling, the excess of $NaNH_2$ is destroyed with a small amount of alcohol, and the benzene solution is washed with water, whereupon the benzene is distilled off. The residue is absorbed by ether and treated with active carbon. After distilling off the ether, the residue is covered with petroleum ether by pouring and is cooled thereafter. The 4-(4'-methoxybenzylanilino) - 1 - methylpiperidine crystallizes.

Melting point: 115° C. (recrystallized from dibutyl ether).

Yield: 68% of the theory.

The dihydrochloride-monohydrate $$C_{20}H_{30}O_2N_2Cl_2$$

can be obtained in the form of crystals from alcohol and has a melting point of 192° C.

EXAMPLE 2

*4-(4'-methylbenzylanilino)-1 - methylpiperidine*

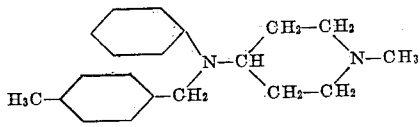

In accordance with the method of Example 1, 30 g. of 4-anilino-1-methylpiperidine are condensed in the presence of 8 g. of sodium amide in 300 cc. of benzene with 25 g. of 4-methylbenzyl chloride. The 4-(4'-methylbenzylanilino) - 1 - methylpiperidine is obtained with a yield of about 80% of the theory.

Melting point: 87° C. (recrystallized from dibutyl ether).

The dihydrochloride of the base, $C_{20}H_{28}N_2Cl_2$, melts at 198° C. if recrystallized from alcohol.

EXAMPLE 3

*4-(N-4'-chlorobenzylanilino)-1-methylpiperidine*

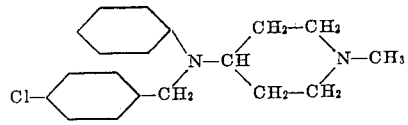

In accordance with the method of Example 1, 30 g. of 4-anilino-1-methylpiperidine are condensed in the presence of 8 g. sodium amide in 300 cc. of benzine with 28 g. of 4-chlorobenzyl chloride to form 4-(4'-chlorobenzylanilino)-1-methylpiperidine. Crystals are obtained which have a melting point of 115° C. if recrystallized from dibutyl ether. The dihydrochloride of this base, having the formula $C_{19}H_{25}N_2Cl_3$, melts at 193° C. (recrystallized from alcohol).

EXAMPLE 4

*4-(N-4'-bromobenzylanilino)-1-methylpiperidine*

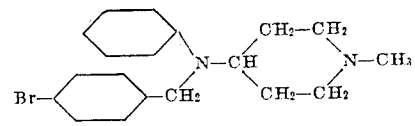

In accordance with the method of Example 1, paragraph c, 30 g. of 4-anilino-1-methylpiperidine are condensed in the presence of 8 g. of sodium amide in 300 cc. of benzene with 35.5 g. of 4-bromobenzyl chloride to form 4-(N-4'-bromobenzylanilino)-1 - methylpiperidine. The base melts at 122° C. (recrystallized from dibutyl ether); the dihydrochloride of this base, $$C_{19}H_{23}H_2BrCl_2$$

melts at 214–215° C. if crystallized from alcohol.

EXAMPLE 5

*4-(N-phenyl-N-4'-methoxy-benzyl)-amino-1-methylpiperidine*

In a flask with three necks, provided with stirrer return condenser, gas supply pipe, and drop funnel, 3.6 g. of sodium amide are added to 12.3 g. of N-4-methoxy-benzylaniline, dissolved in 200 cc. xylol. Into the solution formed, 10 g. of 1-methyl-4-chloropiperidine are dropped within one hour while stirring, boiling and introducing nitrogen. After boiling for 12 hours with stirring in nitrogen atmosphere, the excess of sodium amide is decomposed by alcohol. The reaction product is washed with water, the benzene is distilled off, and the residue is mixed with petroleum ether whereat crystallization takes place. After recrystallization from dibutyl ether, or methanol the base obtained in a yield of 40–50% of the theory has a melting point of 115° C. The dihydrochloride of this base, $C_{20}H_{26}ON_2.2HCl.H_2O$ melts at 192° C. recrystallized from alcohol.

EXAMPLE 6

*4 - (N - phenyl - N - 4' - chlorobenzyl) - amino-1 - methylpiperidine*

In a flask, such as that used in Example 5, 20 g. of finely pulverized, freshly burnt potassium carbonate are added to 12.6 g. of N-4-chlorobenzylaniline dissolved in 200 cc. of xylol. Into this solution, 10 g. of freshly distilled 1-methyl-4-chloropyridine are dropped within two hours. The resulting solution is further treated in the manner described in Example 5. The reaction product then obtained is extracted with dibutyl ether while boiling. The resulting base crystallizes from the formed solution upon cooling. On recrystallization from dibutyl ether it has a melting point of 115° C. The yield is 30–40% of the theory.

The dihydrochloride of this base $$C_{19}H_{23}N_2Cl.2HCl$$

has a melting point of 193° C. when recrystallized from alcohol.

Having thus described my invention, what I claim is:

1. As new products, the derivatives of 4-(N-phenyl-N-benzyl)-amino-1-methylpiperidine, in the benzyl group of which the hydrogen of the para-position is substituted by a member of the group consisting of Cl, Br, CH₃ and OCH₃.

2. As new products, the compounds corresponding with the general formula:

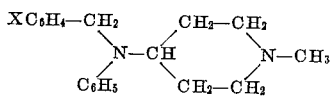

wherein X is a member of the group consisting of Cl, Br, CH₃, and OCH₃.

3. As a new product, the compound 4-(4'-methoxy-benzylanilino)-1-methylpiperidine having a melting point of about 115° C.

4. As a new product, the compound 4-(4'-methyl-benzylanilino)-1-methylpiperidine having a melting point of about 87° C.

5. As a new product, the compound 4-(N-4'-chlorobenzylanilino)-1-methylpiperidine having a melting point of about 115° C.

6. As a new product, the compound 4-(N-4'-bromobenzylanilino-1-methylpiperidine having a melting point of about 122° C.

7. The process which comprises the steps of condensing 1-methylpiperidone-4 with aniline, reducing the thus obtained Schiff's base to form the corresponding secondary amine, and reacting said secondary amine with a derivative of benzyl chloride in which the hydrogen atom of the para-position is substituted by a member of the group consisting of Cl, Br, CH₃, and OCH₃.

8. The process which comprises condensing a 4-halogen-1-methylpiperidine in the presence of a condensing agent with a derivative of benzylaniline wherein the hydrogen atom of the para-position of the benzyl radical is substituted by a member of the group consisting of Cl, Br, CH₃, and OCH₃.

9. The process which comprises the steps of condensing 1-methylpiperidone-4 with aniline, reducing the resulting anil to the corresponding secondary amine, replacing the hydrogen atom linked to the nitrogen atom of the secondary amine by a metallic residue of the group consisting of Na, K, Li and Mg-halogen, and causing the metal compound formed to react with a derivative of benzyl chloride, the hydrogen in the para-position of which is substituted by a member selected from the group consisting of chlorine, bromine, the methyl and the methoxy radical.

10. The process which comprises condensing N-4-methoxy-benzyl aniline in the presence of sodium amide with 1-methyl-4-chloropiperidine, decomposing the excess of sodium amide present, and recovering the resulting product.

11. The process which comprises condensing N-4-chlorobenzyl aniline in the presence of potassium carbonate with 1-methyl-4-chloropiperidine, and recovering the resulting product.

No references cited.